Patented July 10, 1934

1,965,956

UNITED STATES PATENT OFFICE 1,965,956

PRODUCTION OF HYDROGENATED AROMATIC HYDROCARBONS OR DERIVATIVES THEREOF

Manfred Dunkel, Mannheim, Eugen Dorrer and Wilhelm Breuers, Ludwigshafen-on-the-Rhine, Germany, assignors to I. G. Farbenindustrie Aktiengesellschaft, Frankfort - on - the - Main, Germany No Drawing. Application May 2, 1931, Serial No. 534,696. In Germany April 27, 1929

9 Claims. (Cl. 260—168)

This application is a continuation-in-part of the application for Letters Patent Ser. No. 439,849 filed March 28, 1930.

The present invention relates to improvements in the production of hydrogenated aromatic hydrocarbons or derivatives thereof.

A process for the production of hydroaromatic hydrocarbons or derivatives of the same has already been proposed in which aromatic initial materials are treated with hydrogen or a gas containing or supplying hydrogen under pressure in the presence of catalysts immune from poisoning by sulphur and under conditions more strenuous than those required only for the purification of crude hydrocarbons from the sulphur compounds contained therein, and in any event at temperatures exceeding 350° C.

We have now found that the hydrogenation of aromatic initial materials, such as crude hydrocarbons and in particular crude aromatic hydrocarbons which is also intended to include the hydrogenation of crude products containing considerable amounts of these, say more than 20 per cent, as for example, certain benzines obtained by cracking, to hydroaromatic hydrocarbons or their derivatives can also be carried out in a highly satisfactory manner when the operation is carried out at temperatures below 350° C. in the presence of mixed catalysts comprising from 0.25 to 4 molecular proportions of oxides, hydroxides or sulphides or compounds furnishing the same of metals of the 6th group of the periodic system, in admixture with one molecular proportion of metals of group 8 or of heavy metals of group 1, as such or in the form of their compounds, and which are advantageously deposited on carriers. The said catalysts are immune from poisoning by sulphur and other catalyst poisons.

The reaction may generally speaking be carried out at temperatures of down to about 250° or even to about 200° C. Lower temperatures may also be employed in some cases.

A very important condition for extensive hydrogenation is a large and readily accessible surface of the carrier, and a uniform distribution of the catalyst thereon. The larger the surface of the carrier, the greater is the amount of catalyst substance that can be deposited thereon without impairing the efficiency of the catalyst. An addition of activating admixtures usually in small amounts not exceeding 20 per cent of solid oxides, hydroxides or sulphides or compounds furnishing the same, such as carbonates or oxalates, of elements of groups 2 to 7 of the periodic system, which compounds are not already contained in the catalyst, is particularly advantageous.

The following catalysts have been found to be particularly advantageous for carrying out the present invention. In the combination given, the metals, in so far as they belong to the 6th group of the periodic system may be employed in the form of their oxides, hydroxides or sulphides or compounds furnishing the same such as carbonates or oxalates, whereas the metals specified belonging to the 1st and 8th groups of the periodic system may be employed in the metallic form or as compounds such for example as oxides or sulphides or of compounds supplying the said metals or their compounds. The said catalysts may be mixed in any desired proportions within the limits herein specified, but usually molecular proportions have been found to be most advantageous. Such catalysts are for example cobalt-tungsten, iron-molybdenum, cobalt - molybdenum - copper, nickel - chromium, nickel-molybdenum, iron-tungsten, cobalt-molybdenum, cobalt-molybdenum-calcium, aluminium-chromium - nickel, copper - uranium - antimony, platinum-tungsten, palladium-chromium, osmium-chromium-zinc, osmium-molybdenum, osmium-molybdenum-cerium, cobalt-tungsten-antimony, cobalt-chromium-calcium, cobalt-nickel-chromium, palladium-molybdenum-zinc, silver-nickel-molybdenum, silver-molybdenum, silver-molybdenum-magnesium, silver-cobalt-chromium, cobalt-tungsten-molybdenum, nickel-chromium-manganese or nickel-cadmium-molybdenum. The catalysts comprising the compounds specified of molybdenum or tungsten are particularly advantageous. As typical examples of carriers to which the said catalysts may be applied, or on which they may be deposited may be mentioned, active charcoal, fullers' earth, Florida earth, diatomaceous earth, silica gel, alumina gel, pumice stone, bauxite, burnt fireclay and the like. Usually between 10 and 20 parts by weight of catalyst substance are deposited on 100 parts by weight of carrier substance.

Generally speaking high pressures, for example a hydrogen pressure of over 100 atmospheres, are highly advantageous in the process according to the present invention. On account of the fact that hydrogenation to any desired extent can according to the present invention be obtained at temperatures below 350° C. by the use of the said mixed catalysts, the new process has the advantage of avoiding higher temperatures which prove adverse, in certain circumstances, on account of the resulting risk of the decomposition of the hydrogenation products formed, and because, at these high temperatures, the equilibrium of the reaction no longer lies completely on the side of the saturated products, even when very high hydrogen pressures are employed.

According to the present invention, crude aromatic hydrocarbons, even such as contain 0.5 per cent of sulphur, can be converted into the corresponding hydroaromatic, pure hydrocarbons completely saturated with hydrogen. By suitably modifying the conditions, products with different degrees of saturation can be obtained from polynuclear hydrocarbons. Thus for example by increasing the pressure a higher degree of saturation is attained, as also by increasing the duration of contact with the catalyst.

The following examples will further illustrate the nature of this invention but the invention is not restricted to these examples.

Example 1

Commercial pure benzol, containing 0.05 per cent of sulphur is passed over a catalyst prepared from 3 parts of platinum sulphide and 11.2 parts of tungsten sulphide and deposited on 85.8 parts of active silica, in a current of hydrogen, under a pressure of about 200 atmospheres and at a temperature of about 320° C. A pure cyclohexane of at least 98 per cent is obtained.

If a motor benzol with 0.11 per cent of sulphur, 82 per cent of which distils over up to 100° C., and 98 per cent up to 135° C., be treated in the specified manner, a completely hydrogenated product is obtained which no longer gives any reaction with the acid mixture employed for nitrations.

Example 2

A solvent benzol having a specific gravity at 20° C. of 0.875, which boils to the extent of 95 per cent between 140° and 190° C., is passed at a temperature of 310° C. with hydrogen under a pressure of 200 atmospheres over a catalyst consisting of 8.3 parts of tungstic sulphide and 3 parts of nickel sulphide deposited on 88.7 parts of bleaching earth. In this manner a hydrogenated solvent benzol is obtained, which has a specific gravity at 20° C. of 0.790 and which boils to the extent of 95 per cent between 130° and 190° C. The said product no longer shows any reaction with concentrated sulphuric acid or with concentrated nitric acid. It is an excellent solvent.

In the preparation of the said catalyst the metal compounds were deposited on the bleaching earth in a purely adsorptive manner. This was effected by immersing highly active bleaching earth in a normal solution of sodium sulphotungstate and allowing it to remain therein for some time, while stirring. The bleaching earth was then filtered off by suction and was transferred without washing, either in a moist or in a dry state, into a normal solution of nickel nitrate, in which it was stirred for some time. A base exchange thus took place in which the nickel was fixed by adsorption. The bleaching earth was then filtered off from the solution without washing and dried.

Example 3

Centrifuged naphthalene, containing 0.13 per cent of sulphur, is passed in liquid form, under a hydrogen pressure of about 150 atmospheres and at about 300° C., over a fixed catalyst prepared from 3.7 parts of nickel oxide and 7.2 parts of molybdenum sulphide together with 0.3 part of calcium carbonate deposited on active charcoal. Decahydronaphthalene, containing 3 per cent of tetrahydronaphthalene, is obtained. By operating under otherwise equal conditions, but at pressures of about 50 to 70 atmospheres, tetrahydronaphthalene is exclusively obtained.

Example 4

Purified 94 per cent anthracene is heated at about 220° C. and under a hydrogen pressure of about 100 atmospheres, in an autoclave provided with stirrers, in the presence of 7.2 parts of cobalt sulphide and 7.5 parts of molybdenum sulphide deposited on Florida earth. A mixture of octahydroanthracene, melting at 76° C., with deca- and dodecahydroanthracene is obtained.

What we claim is:—

1. In the production of hydroaromatic compounds by treatment of aromatic hydrocarbons with a gas consisting substantially of hydrogen under a pressure of at least 100 atmospheres, the step of operating at a temperature between 200° and 350° C. in the presence of a mixed catalyst essentially comprising from 0.25 to 4 molecular proportions of a compound selected from the class consisting of oxides, hydroxides, sulphides and compounds yielding the same of a metal of the 6th group of the periodic system in admixture with one molecular proportion of a heavy metal selected from groups 1 and 8 of the periodic system.

2. In the production of hydroaromatic compounds by treatment of aromatic hydrocarbons with a gas consisting substantially of hydrogen under a pressure of at least 100 atmospheres, the step of operating at a temperature of between 200° and 350° C. in the presence of a mixed catalyst essentially comprising from 0.25 to 4 molecular proportions of a compound selected from the class consisting of oxides, hydroxides, sulphides and compounds yielding the same of a metal of the 6th group of the periodic system in admixture with one molecular proportion of a heavy metal selected from groups 1 and 8 of the periodic system, said catalyst being deposited on a carrier.

3. In the production of hydroaromatic compounds by treatment of aromatic hydrocarbons with a gas consisting substantially of hydrogen under a pressure of at least 100 atmospheres, the step of operating at a temperature of between 250° and 350° C. in the presence of a mixed catalyst essentially comprising from 0.25 to 4 molecular proportions of a compound selected from the class consisting of oxides, hydroxides, sulphides and compounds yielding the same of a metal of the 6th group of the periodic system in admixture with one molecular proportion of a heavy metal selected from groups 1 and 8 of the periodic system, said catalyst being deposited on a carrier.

4. In the production of hydroaromatic compounds by treatment of aromatic hydrocarbons with a gas consisting substantially of hydrogen under a pressure of at least 100 atmospheres, the step of operating at a temperature between 200° and 350° C. in the presence of a mixed catalyst essentially comprising from 0.25 to 4 molecular proportions of a compound selected from the class consisting of oxides, hydroxides, sulphides and compounds yielding the same of a metal of the 6th group of the periodic system in admixture with one molecular proportion of a heavy metal selected from groups 1 and 8 of the periodic system, said catalyst being deposited on a carrier, and containing also an activating admixture selected from the class of the solid oxides, hydroxides, sulphides and compounds furnishing the same of an element of groups 2 to 5 and 7 of the periodic system.

5. In the production of hydroaromatic compounds by treatment of aromatic initial materials with a gas consisting substantially of hydrogen under a pressure of at least 100 atmospheres, the step of treating as an initial material a crude aromatic hydrocarbon and of operating at a temperature between 200° and 350° C. in the presence of a mixed catalyst essentially comprising from 0.25 to 4 molecular proportions of a compound selected from the class consisting of oxides, hydroxides, sulphides and compounds yielding the same of a metal of the 6th group of the periodic system in admixture with one molecular proportion of a heavy metal selected from groups 1 and 8 of the periodic system, said catalyst being deposited on a carrier.

6. In the production of hydroaromatic compounds by treatment of aromatic initial materials with a gas consisting substantially of hydrogen under a pressure of at least 100 atmospheres, the step of treating as an initial material crude benzol and of operating at a temperature between 200° and 350° C. in the presence of a mixed catalyst essentially comprising from 0.25 to 4 molecular proportions of a compound selected from the class consisting of oxides, hydroxides, sulphides and compounds yielding the same of a metal of the 6th group of the periodic system in admixture with one molecular proportion of a heavy metal selected from groups 1 and 8 of the periodic system, said catalyst being deposited on a carrier.

7. In the production of hydroaromatic compounds by treatment of aromatic hydrocarbons with a gas consisting substantially of hydrogen under a pressure of at least 100 atmospheres, the step of operating at a temperature of between 250° and 350° C. in the presence of a mixed catalyst essentially comprising from 0.25 to 4 molecular proportions of a compound selected from the class consisting of oxides, hydroxides, sulphides and compounds yielding the same of molybdenum in admixture with one molecular proportion of a heavy metal selected from groups 1 and 8 of the periodic system, said catalyst being deposited on a carrier.

8. In the production of hydroaromatic compounds by treatment of aromatic hydrocarbon with a gas consisting substantially of hydrogen under a pressure of at least 100 atmospheres, the step of operating at a temperature of between 250° and 350° C. in the presence of a mixed catalyst essentially comprising from 0.25 to 4 molecular proportions of an oxide of molybdenum in admixture with one molecular proportion of nickel, and deposited on a carrier.

9. A process for the hydrogenation of solvent benzol, which comprises treating it at a temperature of below 350° C. and above about 250° C. with hydrogen under a pressure of at least 100 atmospheres in the presence of a catalyst consisting of from 0.25 to 4 molecular proportions of nickel oxide in admixture with one molecular proportion of molybdenum oxide deposited on active charcoal.

MANFRED DUNKEL.
EUGEN DORRER.
WILHELM BREUERS.